United States Patent
Le et al.

(10) Patent No.: US 6,243,668 B1
(45) Date of Patent: Jun. 5, 2001

(54) INSTRUCTION SET INTERPRETER WHICH USES A REGISTER STACK TO EFFICIENTLY MAP AN APPLICATION REGISTER STATE

(75) Inventors: Bich-Cau Le; Anthony Fitzgerald Istvan, both of San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/131,187

(22) Filed: Aug. 7, 1998

(51) Int. Cl.[7] ..................................................... G06F 9/455

(52) U.S. Cl. ..................................... 703/27; 703/26; 717/7

(58) Field of Search ........................... 703/26, 27; 717/3, 717/5, 7; 709/1

(56) References Cited

U.S. PATENT DOCUMENTS

| | | | |
|---|---|---|---|
| 5,875,318 | * | 2/1999 | Langford ................................ 717/7 |
| 5,953,520 | * | 9/1999 | Mallick ................................ 703/26 |
| 6,009,261 | * | 12/1999 | Scalzi et al. ........................ 703/26 |
| 6,031,988 | * | 2/2000 | Nakashima .......................... 703/26 |
| 6,041,402 | * | 3/2000 | Cannon et al. ...................... 703/26 |
| 6,044,220 | * | 3/2000 | Bretetnitz et al. ................... 717/5 |
| 6,091,897 | * | 7/2000 | Yates et al. .......................... 717/8 |

OTHER PUBLICATIONS

Ebcioglu et al., "DAISY: Dynamic Compilation for 100% Architectural Compatibility", Proceedings of the 24th International Symposium on Computer Architecture, pp. 26–37, Jun. 1997.*

Ertl, A., "Stack Caching for Interpreters", Proc. of the Conf. on Programming Language Design and Implementation, pp. 315–327, Jun. 1995.*

Cmelik et al., "Shade: A Fast Instruction–Set Simulator for Execution Profiling", Proc. of the 1994 Conf. on Measurement and Modeling of Computer Systems, pp. 128–137, May 1994.*

Le, B., "An Out–of–Order Execution Technique for Runtime Binary Translators", Proc. of the 8th Intern. Conf. on Architectural Support for Programming Languages and Operating Systems, pp. 151–158, Oct. 1998.*

* cited by examiner

Primary Examiner—Kevin J. Teska
Assistant Examiner—Douglas W. Sergent

(57) ABSTRACT

A method of executing a program compiled for a base instruction set architecture different than a native instruction set architecture, on a native machine by organizing a runtime system module into at least a low level domain, a medium level domain, and a high level domain. A memory buffer referred to as a backing store is created to correspond to a register stack and have a one-to-one mapping with the register stack. The invention initializes a beginning of the backing store to contain user-visible register values which constitute base instruction set architecture register values, and sets a virtual instruction pointer to a current instruction which is to be executed.

The method of the present invention executes a start routine for forcing a reload of the user-visible register values from the backing store to the register stack and returns to the low level domain to perform a lookup operation in a translation lookaside buffer. The present invention also calls the medium level domain from the low level domain to perform a lookup operation in an address map if the lookup operation in the translation lookaside buffer fails. It further calls the medium level domain if a translated block performs a system call. The method also spills user-visible register values from the register stack to the backing store when it switches from the medium level domain to the high level domain only if a translated block for the current instruction to execute does not exist or a system call is performed which needs to access a base instruction set register state. It also returns from the high level domain to the low level domain if the translated block exists in memory for the current instruction to execute.

18 Claims, 2 Drawing Sheets

INSTRUCTION SET INTERPRETER WHICH USES A REGISTER STACK TO EFFICIENTLY MAP AN APPLICATION REGISTER STATE

BACKGROUND

The present invention relates generally to a computer software instruction set interpreter. More particularly, the present invention relates to an instruction set interpreter which utilizes a register stack to improve the performance of the interpreter.

As a general concept, computer equipment produced by one manufacturer can use a different instruction set architectures (ISA) and a different operating system than another manufacturer uses. For example, some Hewlett-Packard® equipment contains a PA RISC® ISA and a UNIX® operating system, and some APPLE® equipment contains a POWER PC® ISA and a MACINTOSH® operating system. Since the ISA for a specific system defines computer software instructions available to a programmer, program instructions written for the PA RISC® hardware could not automatically run on the POWER PC® hardware. Hereinafter, the term base ISA will be used to refer to an ISA like PA RISC®, for example, which differs from an ISA of a native machine using a native ISA such as POWER PC®.

Programmers typically do not write programs in a language that a system's ISA can readily understand; they write the programs in a high level language like C, C++, or Pascal. Additionally, since such programs usually consist of multiple modules, programmers can write the various modules in a different language. To run the program on a base machine with the base ISA architecture, the programmer can compile the program to convert the high level languages to ISA-level instructions. A final program combines all the compiled versions of the modules and any modules handwritten in machine code. If another machine utilizes a native ISA different from the base ISA, to run the base ISA instructions on the native machine they will need to be emulated on the native machine.

To run base ISA instructions on a native machine, recent implementations of instruction set interpreters (ISI) use a combination of two emulation techniques, pure interpretation and binary translation. Pure interpretation means that the base ISA instructions are fetched one instruction at a time, decoded, and executed. Binary translation means that the base ISA instructions are converted to sequences of native ISA instructions which reproduce the behavior of the base ISA code. The native code can be stored in a code cache memory so that a user can execute and later reuse the code.

The ISI must model a base ISA register state visible to the base ISA program by mapping the base ISA register state into a native ISA state. Existing ISI's use two types of mapping techniques, memory mapping and register mapping. The memory mapping technique consists of storing the base ISA register values in memory, and the register mapping technique consists of storing the base ISA register values in native ISA registers. Register mapping offers the highest level of performance, and can be used when executing in the code cache. If a portion of the program to be executed has been translated, the base ISA register state can be register mapped because the ISI's translator produces the native code stored in the code cache and dictates its own native ISA register usage conventions A problem exists when executing ISI components written in a high level language like C, C++, or Pascal. Since the high level language compiler dictates register conventions, the base ISA register values must be memory-mapped when executing high level ISI components. Existing ISIs spill base ISA register values from native registers to memory when switching from the code cache to a high level component, and reload them from memory when switching back. Switches become a costly operations in terms of performance, however, because the acts of spilling and reloading require a large number of store and load instructions.

Another problem exists with a stack cutback operation, for example a system call longjmp( ) for the UNIX® type system, in a mixed-mode environment. The ISI can allow the emulated code to call native functions, or native functions to call emulated functions. An application that makes such calls is termed mixed-mode since both native and emulated modes of execution are occurring. Since the stack cutback can cross one or more mode boundaries, requiring the restoration of both the native state and the emulated state, stack cutback can become a complicated operation.

Some computer architectures provide a feature called a register stack. The register stack is a hardware array of registers originally designed to accelerate procedure calls for the high level languages such as C, C++, or Pascal. The procedure typically accepts input arguments, performs an action, and then returns output parameters which are the results. A first procedure, a caller, can access a contiguous subset of the register stack referred to as a frame. If the caller calls a second procedure, a callee, the caller can execute an instruction which slides the frame to a different subset of the register stack. Thus, the callee has access to a new set of registers, and the caller's registers are protected from accidental corruption because they are currently not accessible. If the caller needs to pass parameters to the callee, the caller can make the callee's frame overlap the caller's frame by a number of registers required to pass the parameters. Thus, the caller's output registers become the callee's input registers.

Additionally, a series of nested procedure calls can occur, i.e., the callee can call a third procedure, and the third procedure can call a fourth procedure which calls a fifth procedure, and so on. As new procedures are called, new registers need to be utilized or values in the previously used register could be overwritten and lost. Since the register stack contains a finite number of registers, however, when a series of nested procedure calls exceeds the capacity of the register stack, an overflow condition may occur. During the overflow condition a hardware can automatically spill or transfer the content of registers, beginning with register one (R1), for example, to an area of memory called a backing store. When a callee completes its procedure, the callee executes a return to slide the frame back to a previous state, thus re-exposing the preceding caller's registers. As the series of procedure calls return, an underflow condition occurs and the hardware can reload or transfer the contents from the backing store to the register stack.

Accordingly, in response to the problems discussed above, a primary object of the present invention is to provide an improved method for achieving switches to high level components which minimizes spills to memory and reloads from memory.

Another object of the present invention is to simplify stack cutback operations in the mixed-mode environment.

These and other objects of the present invention will be apparent from the following detailed description of the invention, while referring to the attached drawings in which.

TABLE OF ACRONYMS

This patent utilizes several acronyms. The following table is provided to aid the reader in determining the meaning of the several acronyms:

BSP=backing store pointer.
CPU=central processing unit.
IP=instruction pointer.
ISA=instruction set architecture.
ISI=instruction set interpreter.
TLB-translation lookaside buffer.
VIP=virtual instruction pointer.

DETAILED DESCRIPTION OF THE PREFERRED EMBODIMENT

Broadly stated, the present invention uses a register stack to map the base ISA register state. The present invention is directed to a runtime system for a binary translation system for running binary programs compiled for the base ISA on a native ISA machine.

More specifically, the present invention is a method of executing a program compiled for a base ISA different than a native ISA, on a native machine by organizing a runtime system module into at least a low level domain, a medium level domain, and a high level domain. A memory buffer referred to as a backing store is created to correspond to a register stack and have a one-to-one mapping with the register stack. The invention initializes a beginning of the backing store to contain user-visible register values which constitute base ISA register values, and sets a virtual instruction pointer to a current instruction which is to be executed.

The method of the present invention executes a start routine for forcing a reload of the user-visible register values from the backing store to the register stack and returns to the low level domain to perform a lookup operation in a translation lookaside buffer. It also calls the medium level domain from the low level domain to perform a lookup operation in an address map if the lookup operation in the translation lookaside buffer fails. It further calls the medium level domain if a translated block performs a system call. The method also spills user-visible register values from the register stack to the backing store when it switches from the medium level domain to the high level domain only if a translated block for the current instruction to execute does not exist or a system call is performed which needs to access a base instruction set register state. It also returns from the high level domain to the low level domain if the translated block exists in memory for the current instruction to execute.

Figure 1:
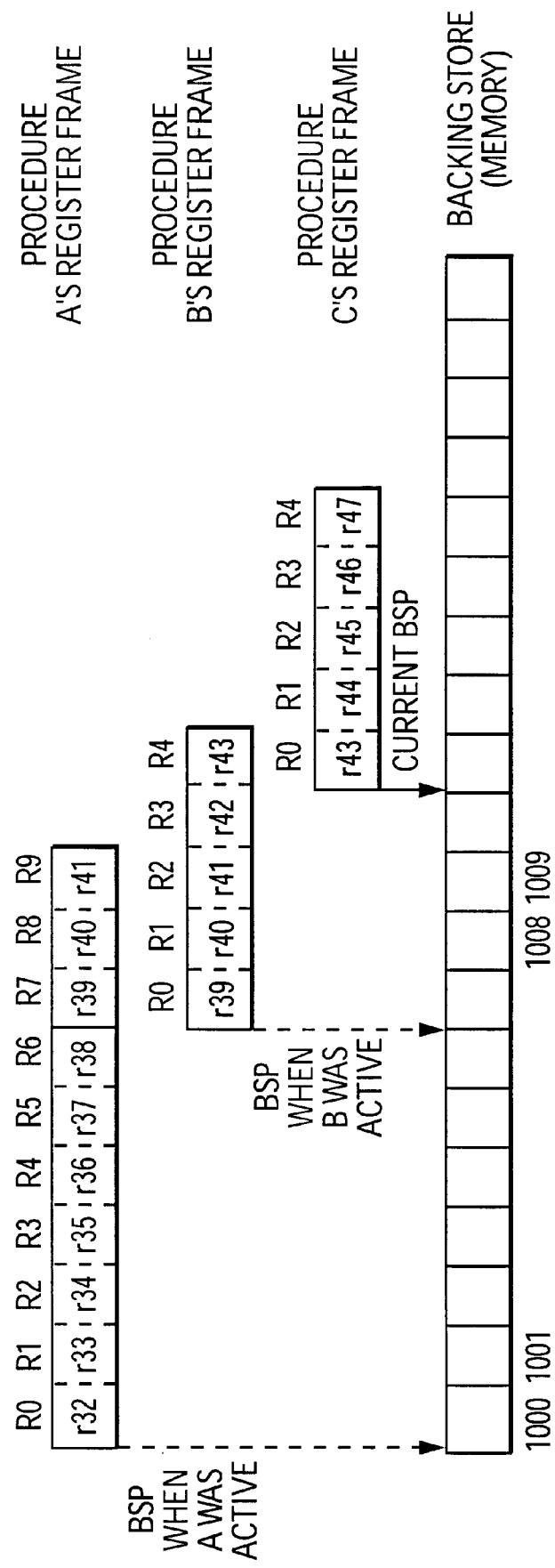
FIG. 1 illustrates register frames, backing store memory, and backing store pointers.

It should be understood that the present interpreter runs on the native ISA machine which features the register stack. Further, as shown in FIG. 1, the stacked registers have a one-to-one correspondence with memory locations of the backing store. In the present example, r32 corresponds to memory location 1000 and r33 corresponds to memory location 1001, etcetera. For purposes of the present invention, native registers are referred to as r0–r127, where r0–r31 are fixed registers and r32–r127 are the stacked registers. The fixed register set consists of global registers, preserved registers, and scratch registers. The stacked register set contains a subset of registers (r32–r(32+N)) referred to as a register context.

In the present invention, the user-visible register state, i.e., state accessible to the base ISA, is called a context. The context consists of base ISA register values R0, R1 . . . RN. Since each native register in the register context is part of the stacked registers, each native register possesses a unique corresponding slot in memory on the backing store. The backing store area corresponding to the register context is referred to as a memory context. Thus, at any given point in time, correct user-visible register values are contained in the register context, the memory context, or a combination of both.

The spill operation is utilized to move the user-visible register values from the register stack to the backing store. Conversely, the reload operation is used to move the user-visible register values from the backing store to the register stack. While the hardware implicitly spills and reloads register values during certain conditions, the ISA may provide instructions to explicitly spill and reload the frame between the register stack and the backing store. The present invention uses these explicit instructions.

Figure 2:
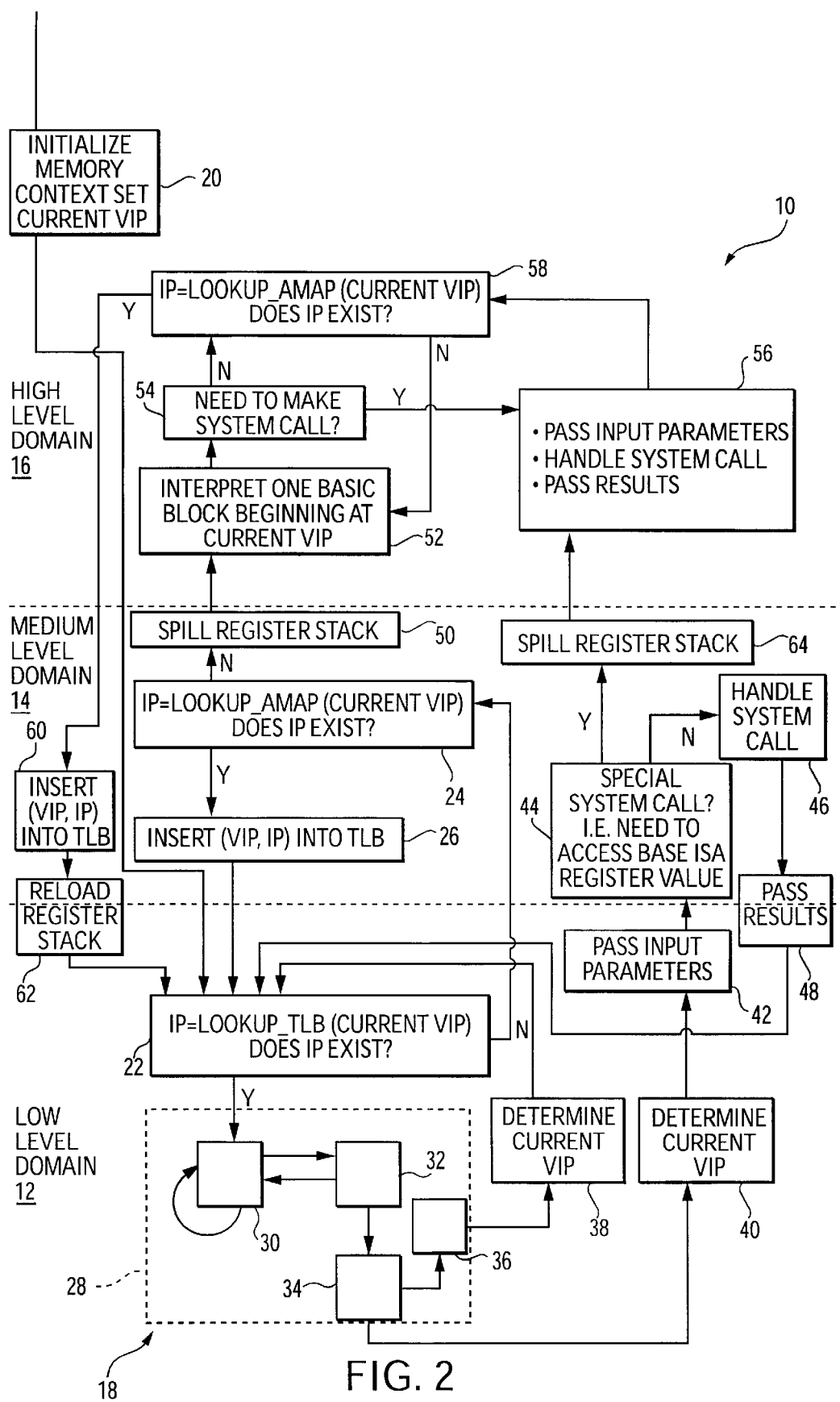
FIG. 2 shows a detailed flow chart of a preferred embodiment of the present invention.

Turning now to FIG. 2, a method is designated generally at 10 and includes the low level domain 12, the medium level domain 14, and the high level domain 16 for organizing a plurality of modules. The plurality of modules comprise the ISI. Some modules are written in the native low level assembly language, while others are written in the high level language like C. The domain dictates where the user-visible register values will be located and what current runtime conventions exist, i.e., how the native registers are used.

Modules executing in the low level domain 12 are small fragments of code that are written in native assembly language, and translated blocks reside in the code cache 18. Importantly, all user-visible register values are located in the register context. Thus, the register values can be read and modified by directly accessing the corresponding stacked registers. Moreover, the runtime register conventions are dictated by the designers of the runtime system, thus the designers are not required to follow conventions of the compiler.

As an illustration, in the low level domain 12 the register stack and the backing store exist in the following state:

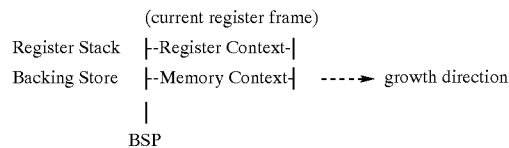

As shown in FIG. 1, the current register frame specifies which registers are accessible to a current procedure corresponding to a backing store pointer (BSP). The BSP points to a backing store slot corresponding to R0 in the current register frame. As shown in the illustration above, since the register context is after the BSP, the current frame is the register context. All stacked registers in the register context are directly accessible, i.e., r32 contains the base ISA register value R0, r33 contains R1, etcetera, through r(32+N) which contains RN.

Moving to the medium level domain 14, modules are written in a high level language such as C. Runtime conventions are dictated by the C compiler. In the medium level domain 14, the interpreter determines whether or not entry into the high level domain 16 is required. Entry into the high level domain 16 is required only if an untranslated block is executed or a system call which needs to access the base ISA register state is made. Thus, in most instances the spill and reload operations are avoided, which increases the performance of the interpreter since the spill and reload operations are costly in terms of performance time. In the medium level domain, the register stack and the backing store are in the following state:

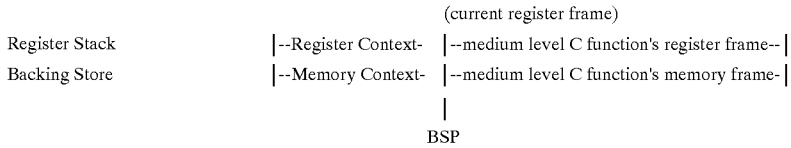

The BSP points to a memory location located after the end of the memory context, thus protecting the registers in the register context, i.e., the registers in the register context are not currently accessible by the executing C function.

Similar to the medium level domain 14, the high level domain 16 modules are written in a high level language such as C, and runtime conventions in the high level domain 16 are dictated by the C compiler. In the high level domain 16, however, all user-visible register values are in the memory context. To ensure that correct ISA register values are located in the memory context, the interpreter uses an explicit spill operation when proceeding from the medium level domain 14 to the high level domain 16. The spill operation copies the register values in the register stack located left of the BSP, to the backing store. Importantly, the interpreter may now access the user-visible register values in the memory context. Hence, the interpreter may read or modify the user-visible register values in the memory context. In the high level domain, the register stack and the backing store are in the following state:

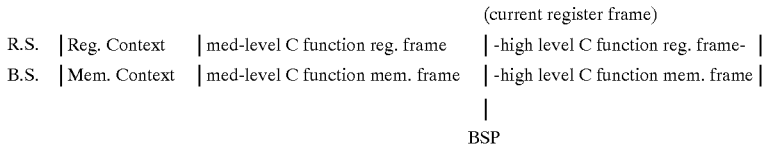

Returning again to FIG. 2, at initialization (block 20), a process begins as a new thread is created. The process is the program in execution, and consists of code and data. The process consists of one or more threads of execution. Initially, when a process is created, the process contains one thread, but the process can subsequently create other threads. If the process contains multiple threads, the threads can collaborate to perform a given task faster than if only one thread was available. In general, all threads within the process share the same code and memory data, however, each thread has its own copy of machine registers. Each thread requires the backing store, the memory context, and the register context.

When the thread is created, a new backing store buffer is created. A beginning of the backing store is set up as the memory context. The memory context is then initialized to contain the initial user-visible register values.

Moreover, a virtual instruction pointer (VIP) for the new thread is set to point to a first base instruction to be executed by that thread. The term VIP is used to distinguish a base ISA instruction pointer value from the native ISA instruction pointer which is referred to hereinafter as IP. All ISAs use the concept of an instruction pointer (IP). The instruction pointer is a special register which contains a memory address of an instruction to execute. After executing the instruction, a machine updates the instruction pointer to point to a next instruction to execute. In other words, a current VIP of the base program is the address of the next base instruction to execute.

An address map is a data structure that maps VIPs to IPs for the translated blocks. The address map is pre-built and constant for static binary translation. The data structure is typically implemented as a hash table with collision chains as is known in the art. Given the complex nature of the address map, the address map is accessed by C routines. Therefore, address map accesses typically only occur in the high level domain 16.

For performance purposes, however, it is desirable to map VIPs and IPs in the low level domain 12, thus allowing excursions into the higher level domains to be avoided in most situations. A special mapping table referred to as a translation lookaside buffer (TLB) is used to achieve a mapping of the VIPs to IPs in the low level domain 12. The TLB is a small, fixed size cache for VIP to IP mappings. The TLB is initially empty and later stores frequently utilized VIP to IP mappings that can be accessed easily in the low level domain 12 using written assembly code.

After the VIP for the new thread is set, the IP is set to point to a native start routine. Moreover, the BSP for the new thread is set as follows:

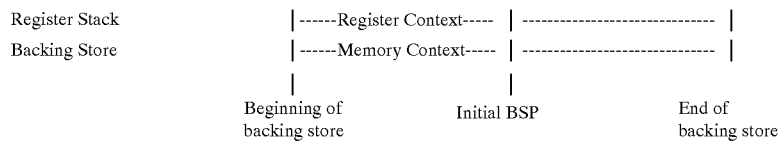

The new thread then executes and calls the start routine. The start routine can be a short, written assembly language code fragment which performs a reload operation to transfer the user-visible register values from the memory context to the register context. It should be recalled that the memory context was initialized to contain the initial user-visible register values when the thread was created. The start routine then returns to a main control point in the low level domain 12 to determine if an IP exists for the current VIP (block 22).

When the VIP to IP mapping is needed in the low level domain 12, the interpreter consults the TLB (block 22). If a mapping is not found in the TLB, then an excursion into the medium level domain 14 is accomplished to search the address map (block 24). If the address map has a mapping for the VIP, then the interpreter inserts the mapping into the TLB so that the next time the same mapping is requested from the TLB, there is a high probability that a lookup will succeed (block 26). If the TLB cache is full at the time of the new mapping, the interpreter may evict some other mappings from the TLB to make room for the new mapping.

If a mapping is found, the returned IP is an address of a corresponding translated block residing in the code cache 18, then control is transferred directly to that IP (block 28).

After a first translated block (block 30) executes, the first translated block can jump to itself or to a second translated block (blocks 32). Thereafter, the second translated block (block 32) can jump to the first translated block (block 30) or to a third translated block (block 34). The third translated block (block 34) can jump to a fourth translated block (block 36) which either ends in an indirect branch or jumps to a block that is not translated. In either case, the interpreter determines the current VIP (block 38), and checks the TLB for an IP mapped to the VIP (block 22). Alternatively, the third translated block (block 34) can make a system call, in which case it is necessary to determine the current VIP for that system call (block 40) and pass the parameters from the low level domain 12 to the medium level domain 14 (block 42).

On a Hewlett-Packard® system, for example, a system call number is passed in R22, and parameters are passed in R23, R24, R25, and R26. The system call and parameters are base ISA register values, therefore they exist in stacked registers in the register context. Control is then transferred to a piece of written assembly code to pass the parameters (block 24). The written assembly code expands the current register frame to include output parameters, declares the registers in the register context as local registers, and declares the registers in the output parameter area as output registers. The state of register stack and the backing store change as follows:

Before:

(current register frame)
               Register Stack   | --Register Context- |
               Backing Store    | --Memory Context- |
                                         |
                                 BSP After:

(current register frame)
        Register Stack   | --Register Context---,-----parameters--- |
        Backing Store    | --Memory Context----------------------- |
                                    |
                               BSP The system call number and parameters are then copied from the appropriate stacked registers in the register context to the output parameter registers. A system call is made to the medium level domain 14. The system call slides the current frame so that local registers are no longer accessible, and the output parameters are now accessible to the medium level function. The state appears as follows:

(current register frame)
        Register Stack     | --Register Context- | -----parameters----- |
        Backing Store      | --Memory Context- | ---------------------- |
                                    |
                               BSP Next, it is determined whether the system call is special, i.e., whether the system call needs to access the base ISA register values (block 44). In practice, special system calls are infrequent. If the system does not need to access the context, the system call is emulated by a C function (block 46). After completion, a system call passes results back to the program (block 48). The program expects those values in certain registers. On Hewlett-Packard® systems, for example, the results are expected in R28 and R29.

Then, a return to the low level domain 12 is accomplished without requiring a reload operation, re-exposing the register context (block 48). A written piece of assembly code copies the results from the system call into the expected stacked registers in the register context (block 48). Then control is transferred back to the TLB lookup point (block 22).

If an IP mapping does not exist for the current VIP in the TLB (block 22), then the address map in the medium level domain 14 is examined to determine if an IP to VIP mapping exists in the address map (block 24). Notice that this step was accomplished without performing a spill operation. If no IP mapping exists for the VIP in the address map, however, then the interpreter spills the register stack (step 50) and enters the high level domain 16. The block is then interpreted beginning at the current VIP (block 52).

System calls can also be accomplished from the high level domain 16. This situation occurs when a system call is achieved after a base basic block is emulated by pure interpretation (blocks 52 and 54). Like making a system call in the low level domain 12, accomplishing a system call in the high level domain 16 requires passing parameters to the system call, and returning results from the system call. A difference is that the base ISA registers used for the passing and returning are in the memory context since the interpreter performed the spill operation. Therefore, a C function can handle the system call (block 56). The C function reads the parameters from the memory context, handles the system call, and copies the system call's results back into the memory context (block 56). Subsequently, control is transferred back to the address map lookup code (block 58).

If an IP for the current VIP does not exist, then the interpreter remains in the high level domain 16 to interpret one block of code beginning at the current VIP. Notice that a reload operation was not required.

If an IP exists for the current VIP, however, then the IP to VIP mapping is placed in the TLB (block 60). Since an IP value exists, a translation for the block of code exists in the code cache. Thus, a reload operation is performed to restore the register context values from the backing store (block 62). When the TLB lookup operation is performed, an IP will exist for the VIP (block 22) and the program execution will jump to the code cache 18 (block 28).

Subsequently, a spill operation can be avoided until the special system call is necessary or the program needs to execute a block which has not been translated. If the translated module requires a system call (block 34), the next VIP is determined (block 40) and parameters are passed to a system called by the system call (block 42). Next, the interpreter determines whether the system call is special (block 44). In the rare instance that the special system call is necessary, the spill operation is performed to update the memory context (block 64), and control is transferred to the high level system call handler (block 56).

If a system call is used to create a new child thread, then a parent thread, i.e., the thread making the system call, begins the initialization procedure by creating a new backing store, and arranging the child's register stack and VIP (block 20).

From the foregoing description, it should be understood that an improved instruction set interpreter has been shown and described which has many desirable attributes and advantages. The present invention is adapted to use the register stack to efficiently perform transitions between low level and high level code. System calls and TLB misses occur relatively frequently, and the present invention handles them without register stack spills or reloads, resulting in higher performance. Moreover, while examples in the description are directed to the runtime system of a static binary translation system, the method of the present invention is applicable to dynamic translation systems as well.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method of executing a program compiled for a base instruction set architecture different from a native instruction set architecture on a native machine having an operating system, a register stack, and a memory, by organizing a runtime system module into at least a low level domain, a medium level domain, and a high level domain, and creating a translation lookaside buffer in the memory, said method comprising the steps of:

creating a backing store in the high level domain, said backing store being a memory buffer corresponding to the register stack located in the low level domain and having a one-to-one mapping with the register stack;

initializing a beginning of said backing store to contain user-visible register values constituting base instruction set architecture register values;

defining a virtual instruction pointer to point to a current instruction of the program to be executed;

executing a start routine for forcing a reload of said user-visible register values from said backing store to the register stack and returning to the low level domain to perform a lookup operation in the translation lookaside buffer;

calling the medium level domain from the low level domain to perform a lookup operation in an address map if said lookup operation in the translation lookaside buffer failed;

calling the medium level domain if a translated block performed a system call to the operating system;

spilling user-visible register values from the register stack to said backing; store when switching from the medium level domain to the high level domain only if a translated block for said current instruction to execute does not exist or a system call is performed which needs to access a base instruction set register state, and performing at least one high level operation in the high level domain; and, returning from the high level domain to the low level domain if said translated block exists for said current instruction to execute.

2. The method in claim 1 wherein said lookup operation in the low level domain further includes the steps of:

checking the translation lookaside buffer for an instruction pointer that has been mapped to said virtual instruction pointer; and transferring control to said instruction pointer if an instruction pointer exists for said virtual instruction pointer in the translation lookaside buffer.

3. The method in claim 1 wherein said lookup operation in the medium level domain further includes the steps of:

checking said address map for an instruction pointer that has been mapped to said virtual instruction pointer;

inserting a VIP to IP mapping data into the translation lookaside buffer, returning to the low level domain, and jumping to said instruction pointer if an instruction pointer exists for said virtual instruction pointer; and calling said high level domain if an instruction pointer does not exist for said virtual instruction pointer.

4. The method in claim 1 wherein said call operation to the medium level domain if a translated block performed a system call further includes the steps of:

determining if said system call is performed which needs to access said base instruction set register state; and passing parameters, handling said system call, and passing results to the program if said system call does not need to access said base instruction set register state.

5. The method in claim 1 wherein said high level operation further includes the steps of:

passing parameters to a system call;

handling a system call; and passing results from said system call to the program.

6. The method in claim 1 wherein said high level operation further includes interpreting at least one block having an address beginning at said current instruction to execute.

7. The method in claim 6 wherein said interpreting operation further includes determining if the program needs to perform a system call.

8. The method in claim 7 wherein said performing operation of said system call further includes the steps of:

passing parameters to a system call;

handling a system call; and passing results from said system call to the program.

9. The method in claim 1 wherein said high level domain to said low level domain return operation further includes the steps of:

inserting a VIP to IP mapping into the translation lookaside buffer;

reloading said user-visible register values to the register stack from said backing store; and returning to the low level domain.

10. An apparatus for executing a program compiled for a base instruction set architecture different from a native instruction set architecture on a native machine having an operating system, a register stack, and a memory, by organizing a runtime system module into at least a low level domain, a medium level domain, and a high level domain, and creating a translation lookaside buffer in the memory, said method comprising the steps of:

means for creating a backing store in the high level domain, said backing store being a memory buffer corresponding to the register stack located in the low level domain and having a one-to-one mapping with the register stack;

means for initializing a beginning of said backing store to contain user-visible register values constituting base instruction set architecture register values;

means for defining a virtual instruction pointer to point to a current instruction of the program to be executed;

means for executing a start routine for forcing a reload of said user-visible register values from said backing store to the register stack and returning to the low level domain to perform a lookup operation in the translation lookaside buffer;

means for calling the medium level domain from the low level domain to perform a lookup operation in an address map if said lookup operation in the translation lookaside buffer failed;

means for calling the medium level domain if a translated block performed a system call to the operating system;

means for spilling user-visible register values from the register stack to said backing store when switching from the medium level domain to the high level domain only if a translated block for said current instruction to execute does not exist or a system call is performed which needs to access a base instruction set register state said spilling means further including means for performing at least one high level operation in the high level domain; and, means for returning from the high level domain to the low level domain if said translated block exists for said current instruction to execute.

11. The apparatus in claim 10 wherein said lookup operation in the low level domain further includes:

means for checking the translation lookaside buffer for an instruction pointer that has been mapped to said virtual instruction pointer; and means for transferring control to said instruction pointer if an instruction pointer exists for said virtual instruction pointer in the translation lookaside buffer.

12. The apparatus in claim 10 wherein said lookup operation in the medium level domain further includes:

means for checking said address map for an instruction pointer that has been mapped to said virtual instruction pointer;

means for inserting a VIP to IP mapping data into the translation lookaside buffer, returning to the low level domain, and jumping to said instruction pointer if an instruction pointer exists for said virtual instruction pointer; and means for calling said high level domain if an instruction pointer does not exist for said virtual instruction pointer.

13. The apparatus in claim 10 wherein said call operation to the medium level domain if a translated block performed a system call further includes:

means for determining if said system call is performed which needs to access said base instruction set register state; and means for passing parameters, handling said system call, and passing results to the program if said system call does not need to access said base instruction set register state.

14. The apparatus in claim 10 wherein said high level operation further includes:

means for passing parameters to a system call;

means for handling a system call; and means for passing results from said system call to the program.

15. The apparatus in claim 10 wherein said high level operation further includes means for interpreting at least one block having an address beginning at said current instruction to execute.

16. The apparatus in claim 15 wherein said interpreting operation further includes means for determining if the program needs to perform a system call.

17. The apparatus in claim 16 wherein said performing operation of said system call further includes:

means for passing parameters to a function;

means for handling a system call; and means for passing results from said function to the program.

18. The apparatus in claim 10 wherein said high level domain to said low level domain return operation further includes:

means for inserting a VIP to IP mapping into the translation lookaside buffer;

means for reloading said user-visible register values to the register stack from said backing store; and means for returning to the low level domain.

* * * * *